Figure 1:
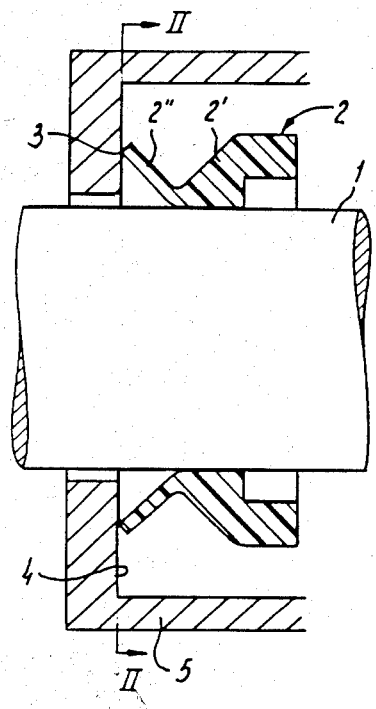

United States Patent [19]

Cuijpers

[11] Patent Number: 4,544,164
[45] Date of Patent: Oct. 1, 1985

[54] SHAFT SEAL IN THE SHAPE OF AN ELLIPTICAL FUNNEL

[75] Inventor: Mathias J. M. Cuijpers, Eindhoven, Netherlands

[73] Assignee: SKF Industrial Trading Development Co. B.V., Nieuwegein, Netherlands

[21] Appl. No.: 684,601

[22] Filed: Dec. 21, 1984

[30] Foreign Application Priority Data

Jan. 26, 1984 [NL] Netherlands ............... 84/00241

[51] Int. Cl.⁴ .................. F16J 15/32; F16J 15/36
[52] U.S. Cl. ............................ 277/25; 277/95; 277/DIG. 8
[58] Field of Search ............... 277/25, 81 R, 83, 95, 277/177, 133, DIG. 8

[56] References Cited

U.S. PATENT DOCUMENTS 3,504,917  4/1970  Malmstrom ............... 277/25
3,703,296 11/1972  Malmstrom ............... 277/25

FOREIGN PATENT DOCUMENTS 249981  3/1964  Australia ............... 277/25
952370  3/1964  United Kingdom ....... 277/25
1001760 8/1965  United Kingdom ....... 277/95

*Primary Examiner*—Robert S. Ward
*Attorney, Agent, or Firm*—Yuter, Rosen & Dainow

[57] ABSTRACT

A seal for a shaft rotatably mounted in a housing. The seal is fabricated of a resilient material and includes a generally hollow elliptical attachment and an annular lip-shaped element which extends outwardly at an angle from a top side of the attachment. The lip-shaped element has a terminal free end which rests against the housing in a plane perpendicular to the shaft axis. When the seal is slidably positioned on the shaft the elliptical attachment deforms into a cylindrical shape in sealing relation with the shaft. This deformation causes the lip-shaped element to assume an elliptical configuration. Rotation of the shaft relative to the housing causes the free end of the lip-shaped element to move back and forth in a radial direction affecting removal of dirt particles from the housing.

5 Claims, 3 Drawing Figures

SHAFT SEAL IN THE SHAPE OF AN ELLIPTICAL FUNNEL

The invention concerns a seal between the circular cylindrical circumferential plane of a first part, in particular a shaft, and a plane of a second part perpendicular to the cardioid line of this circumferential plane. Such sealing elements have a generally annular shape and consist of an annular attachment for attaching the sealing element to one of the parts and a circling lip-shaped element built in and extending at an angle from the one part. The lip-shaped element has a free end which rests resiliently and in accordance with an essentially linear contact edge against said plane of the other part, and which is shaped in such manner that when one of the parts rotates, points of the contact edge possess a velocity vector which cuts the contact edge in these points, so that at these points a velocity component is obtained which is perpendicular to the principal velocity component on account of the rotation. During rotation, the contact edge, covers a surface area of said plane of the other part. A similar seal is known from the U.S. Pat. No. 4,283,064.

A seal of this kind is used particularly for rotating shafts and serves to retain the lubricant present on the one side of the sealing element, and to prevent dirt or dust particles from penetrating the lubricant from the outside.

In the known seal, the sealing element is formed by an annular disk whose outer circumference forms the attachment, which is pressed between two annular flat plates of the first part, and whose inner circumference forms said lip which is at an angle with the outer circumference and, with the inner circumference, rests against the circumferential plane of a shaft whose cardioid line is perpendicular to said plates. Moreover, the contact edge presents prominences so that, when no contact exists with the shaft, the contact edge has a maximum radius at the site of the center of each prominence, and a minimum radius between every two prominences. When there is contact with the shaft, the angle of the lip with regard to the cardioid line of the shaft varies between the smallest angle at the site of said maximum radius and the largest angle at the site of the minimum radius so that the contact edge comes into contact with the shaft according to a somewhat fluctuating circular line. This way, the lubricant is subjected to a hydrodynamic pumping action which causes any lubricant which seeped through in between the seal and shaft to be pumped back. However, this does not result in a better retention of the dirt particles. Moreover, the sealing element applied is quite complicated.

The purpose of the invention is to provide a seal of the type mentioned which would remove dirt particles in a very effective manner, while allowing application of a simple sealing element.

This purpose is met because, in the seal according to the invention, the annular attachment is mounted around the cylindrical circumferential plane of the one part, and because the lip-shaped element rests, with its free end, against the aforementioned plane-perpendicular to the cardioid line-of the other part, whereby this lip-shaped element is shaped in such manner that its free end comes into contact with said plane in accordance with an oval.

This way, the oval-shaped contact edge will cover, during rotation, an annular surface area of the plane perpendicular to the cardioid line of the cylindrical circumferential plane, whereby this edge executes a back and forth movement in a radial direction, so that any dirt particles present will be cast off or swept away.

The invention concerns also a sealing element of a resilient material for application to the seal, consisting of a generally annular attachment and a generally annular lip-shaped element built on to it and extending from it at an angle, whereby, according to the invention, the attachment has the shape of a generally hollow cylinder, and the lip-shaped element extends outward from a top side of the attachment, an angle with regard to the cardioid line of the attachment, whereby the edge of the free end thereof circles around according to an oval.

Preferably, the attachment will have the shape of an elliptical hollow cylinder, whereby the lip-shaped element extends outward from it in the shape of an elliptical funnel.

It is fairly simple to manufacture a similar seal. When the attachment is slided over a shaft, the elliptical hollow cylinder is deformed into a circular cylindrical shape, which causes the attachment to be firmly pressed against the shaft, while the lip-shaped element assumes a circumference which undergoes a gradual transition from a circle to an ellipse.

Figure 2:
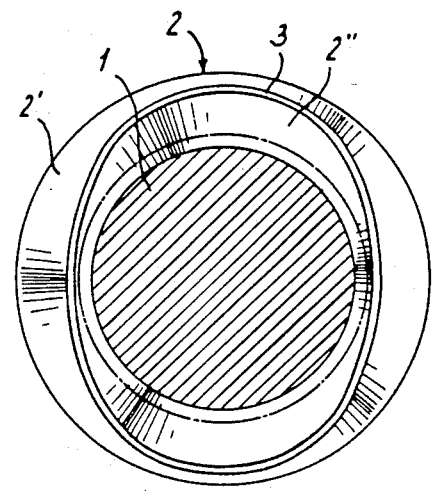
Figure 3:
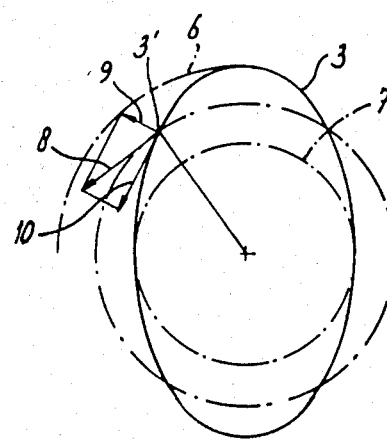

The invention is described in more detail with reference to the drawing, in which:

FIG. 1 shows, in axial cross-section, a seal according to the invention,

FIG. 2 presents the seal in FIG. 1 in a lateral view, according to the line II—II in FIG. 1, and FIG. 3 shows schematically how the seal functions, As shown in FIGS. 1 and 2, around a shaft 1 a sealing element 2 of a resilient material has been mounted, whereby this sealing element 2 includes an attachment 2' and a built-in, circling lip-shaped element 2" extending at an angle. The free end of the lip-shaped element 2" rests resiliently, according to an essentially linear contact edge 3, against the plane 4, which plane 4 is formed by a second part 5.

As shown in FIG. 2, the lip-shaped element 2" has the shape of an oval or elliptical funnel extending outward from the circular cylindrical attachment 2', so that the cross-sections perpendicular to the cardioid line of the shaft 1 assume gradually a more or less oval or elliptical shape, and the contact edge 3 circles around according to an oval or an ellipse.

As shown in FIG. 3, when the shaft 1 rotates, or when the shaft 1 is stationary and a part 5 rotates, the contact edge 3 will cover the annular surface area of the plane 4 extending between the circles 6 and 7. In the course of this process, points of the contact edge 3, for example, point 3', will possess a velocity vector 8 which cuts the contact edge 3 in this point, so that at this point a velocity component 9 is obtained which is perpendicular to the principal velocity component 10 on account of the rotation. Consequently, the contact edge 3 executes a back and forth movement in a radial direction, so that any dirt particles present will be cast off or swept away.

I claim:

1. In a seal between the circular cylindrical circumferential plane of a first part, in particular a shaft, and a plane of a second part perpendicular to the cardioid line of this circumferential plane, whereby one of these parts can rotate around said cardioid line, with a generally annular sealing element of a resilient material, consisting of an annular attachment for attaching the sealing element to the first part and a circling lip-shaped element built in and extending at an angle from the first part, whose free end rests resiliently and in accordance with an essentially linear contact edge against said plane of the second part, and which is shaped in such manner that when one of the parts rotates, points of the contact edge possess a velocity vector which cuts the contact edge in these points, so that at these points a velocity component is obtained which is perpendicular to the principal velocity component on account of the rotation, and the contact edge, during the rotation, covers a surface area of said plane of the second part, the improvement wherein the annular attachment is mounted around the cylindrical circumferential plane of the first part, and the lip-shaped element rests with its free end against said plane of the second part-perpendicular to the cardioid line-of the first part, whereby this lip-shaped element is shaped in such manner that its free end comes into contact with said plane of the second part according to an oval.

2. A sealing element according to claim 1, wherein the attachment has the shape of a generally hollow cylinder and the lip-shaped element extends outward from a top side of the attachment, at an angle with regard to the cardioid line of the attachment, whereby the edge of the free end thereof circles around according to an oval.

3. A sealing element according to claim 2, wherein the attachment has the shape of an elliptical hollow cylinder and the lip-shaped element extends outward from it in the shape of an elliptical funnel.

4. A resilient seal for a shaft rotatably mounted in a housing, the shaft having an axis oriented perpendicular to the housing plane, the seal comprising:

a hollow annular attachment which deforms for slidable positioning on the shaft, and a lip-shaped element integral with the attachment which extends outwardly at an angle from the shaft, said lip-shaped element including a free end which rests resiliently against the housing, said lip-shaped element having an elliptical configuration, so that rotation of the shaft relative to the housing causes the free end of the lip-shaped element to move back and forth in a radial direction to effect removal of dirt particles from the housing.

5. A seal according to claim 4, wherein the attachment has an elliptical shape, and the lip-shaped element has an elliptical funnel configuration.

* * * * *